April 14, 1970     G. A. KIHLBERG ET AL     3,505,865
ARRANGEMENT FOR MEASURING ANGULAR DIFFERENCES
Filed March 15, 1967                         3 Sheets-Sheet 1

United States Patent Office 3,505,865
Patented Apr. 14, 1970

3,505,865
ARRANGEMENT FOR MEASURING ANGULAR DIFFERENCES
Gunnar Axel Kihlberg, Sollentuna, and Karl Erik Olof Byström, Bromma, Sweden, assignors, by mesne assignments, to Jungner Instrument Aktiebolag, Stockholm, Sweden
Filed Mar. 15, 1967, Ser. No. 623,444
Claims priority, application Sweden, Mar. 16, 1966, 3,468/66
Int. Cl. G01l 3/10
U.S. Cl. 73—136
4 Claims

ABSTRACT OF THE DISCLOSURE

A system for measuring angular differences between two mechanical elements, such as toothed wheels, including a transmitter means, such as an inductive transmitter, operatively coupled to each of the mechanical elements and adapted to produce a voltage vector which varies 360 electrical degrees for each pitch of a tooth of the toothed wheel, and a comparison unit adapted to receive the voltage vectors and supply an indication of the angular difference between the mechanical elements, such as an output voltage directly proportional to the difference in phase angle between the voltage vectors. This system for measuring angular differences is preferably used for measuring torsion angles appearing in a shaft so that the torque acting on the shaft can be easily measured.

---

The present invention relates to an arrangement for measuring angular differences. More specifically, it relates to such an arrangement of the kind comprising two inductive transmitters each co-operating with one toothed wheel or similar means to produce an electric signal responsive to the angular position of the respective toothed wheel, and a comparison unit connected to the two transmitters to measure the difference beween their output signals in terms of a predetermined parameter.

The arrangement according to the invention is primarily characterized by the fact that each transmitter comprises means for producing a voltage vector having an angle depending on the angular position of the co-operating toothed wheel irrespectively of whether said toothed wheel is stationary or rotating, and that the comparison unit is arranged to measure the angular difference between the voltage vectors produced by the two transmitters.

In a preferred embodiment of the invention, each transmitter comprises:

(a) means for producing two A.C. voltages of the type $$U_1 = k \cdot \hat{U} \sin \omega t \cdot \cos (q \cdot \beta)$$

and $$U_2 = k \cdot \hat{U} \sin \omega t \cdot \sin (q \cdot \beta)$$

respectively, where $q$ is the number of teeth of the co-operating toothed wheel, and $\beta$ designates the angular position of said toothed wheel; and (b) means for combining these voltages into said voltage vector.

A particularly interesting field of application of the arrangement according to the invention is for measuring the torque of a shaft. In this case, according to the invention, the two toothed wheels are to be mounted on the shaft in a predetermined axially spaced relation.

In the application of the invention just mentioned, the comparison unit may preferably be arranged to produce an electric output signal proportional to the angular difference between the voltage vectors generated by the two transmitters, and consequently, to the torque of the shaft. This arrangement makes it possible to determine directly the magnitude of the torque of the shaft.

The arrangement of the invention can also be arranged so as to permit a direct measurement of the shaft power. As a matter of fact, if the comparison unit is fed with a voltage proportional to the rotary speed of the shaft, then it may be caused to generate an output signal which is proportional to the shaft torque multiplied by the shaft speed, i.e. proportional to the shaft power.

The invention will now be described more in detail, reference being had to the accompanying drawings, in which.

Figure 1:
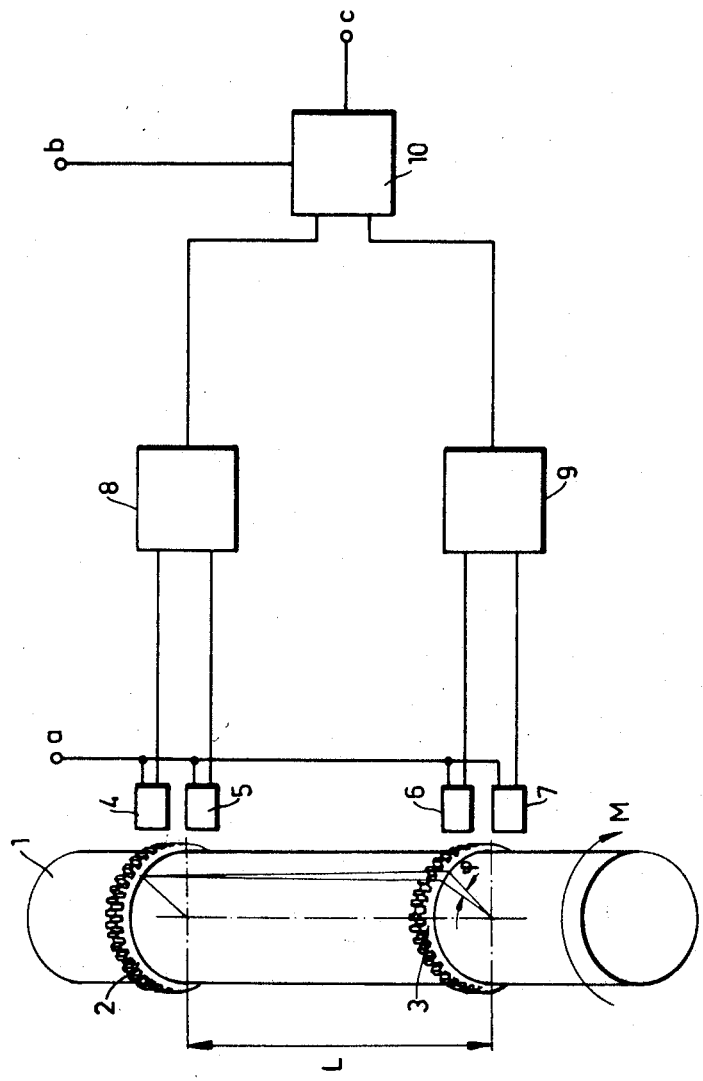
FIGURE 1 is an elementary diagram illustrating an arrangement according to the invention used for measuring the torque of a shaft.

In FIGURE 1, numeral 1 designates a shaft having mounted thereon two toothed wheels 2 and 3 which are axially spaced by a distance L. Adjacent to each toothed wheel there is provided a pair of inductive transmitter elements 4, 5 and 6, 7, respectively. Each such pair may consist of two elements combined into an integral unit, or of two separate elements. The transmitter elements comprise iron cores having teeth facing the toothed wheel, and primary and secondary windings disposed on said cores. The primary windings of the transmitter elements are connected in common to a terminal $a$ which is, in turn, connected to an A.C. voltage source, while the secondary windings of transmitter elements 4 and 5 are connected to the input of a phase-shift network 8, and the secondary windings of transmitter elements 6 and 7 are connected to the input of a phase shift network 9. The outputs of the two phase-shifters 8 and 9 are connected to respective inputs of an angular deviation measuring device 10 which has the required supply voltage fed to it over a terminal $b$ connected to a supply voltage source, and the output of which is connected to a terminal $c$.

The mode of operation of the arrangement thus formed will now be described more in detail. To start with, it is assumed that the shaft is stationary and subjected to a torque M. This torque will give rise to a torsion of the shaft 1, causing an angular displacement between the two toothed wheels 2 and 3. In FIGURE 1 the corresponding angle is designated by $\varphi$. The relative angular displacement of the toothed wheels is sensed by means of the transmitter elements 4, 5, 6 and 7 inductively coupled thereto, these elements being arranged so that when their primary windings are supplied with an A.C. voltage $U = \hat{U} \sin \omega t$, the amplitudes of the A.C. voltages induced in the secondary windings of said elements will vary sinusoidally depending on the angular position of the respective toothed wheel. More particularly, the transmitter elements are designed so as to cause the amplitude of the voltage induced in a secondary winding to vary from its maximum to its minimum value and then to resume its maximum value during an angular displacement of the toothed wheel corresponding to the tooth pitch. Further, the transmitter elements within each pair are arranged in such a manner that their output voltage $U_1$ and $U_2$ will follow the equations:

$$U_1 = k \cdot \hat{U} \cdot \sin \omega t \cdot \cos (q \cdot \beta)$$

and $$U_2 = k \cdot \hat{U} \cdot \sin \omega t \cdot \sin (q \cdot \beta)$$

respectively, where $q$ is the number of teeth of the co-operating toothed wheel, and $\beta$ designates the angular position of said toothed wheel.

Within the phase-shifting network 8 or 9 connected to the transmitter element concerned said voltages $U_1$ and $U_2$ are combined into a voltage vector $\overline{U}_f$ which is of the form $$\overline{U}_f = k_1 \cdot \hat{U} \cdot \sin \omega t \cdot e^{j(q \cdot \beta + \theta)}$$

where $\theta$ is a constant depending on the phase-shifting network.

Since, as a result of the torque M acting on the shaft, the two toothed wheels are relatively displaced by an angle $\varphi$, the voltage vectors $\overline{U}_a$ and $\overline{U}_b$ produced by the phase-shifting networks 8 and 9 will be of the form $$\overline{U}_a = k_1 \cdot \hat{U} \cdot \sin \omega t \cdot e^{j(q \cdot \beta_0 + \theta)}$$

$$\overline{U}_b = k_1 \cdot \hat{U} \cdot \sin \omega t \cdot e^{j[q(\beta_0 + \varphi) + \theta]}$$

respectively, where $\beta_0$ is the angular coordinate of toothed wheel 2.

The angular deviation $\varphi$ between the two vectors is measured by the measuring device 10 which, when supplied with a D.C. voltage $U_s$, will furnish an output voltage $$U_{out} = U_s \cdot \frac{q \cdot \varphi}{2\pi}$$

It is easily shown that this voltage is proportional to the torque M acting on shaft 1. Since, according to well-known laws:

$$\varphi = \frac{M \cdot L}{G \cdot I_p}$$

where G is the shear modulus of the shaft, and $I_p$ is the angular momentum, or moment of inertia, of the shaft; it follows that:

$$U_{out} = \frac{U_s \cdot q \cdot L}{2\pi \cdot G \cdot I_p} \cdot M = k_2 \cdot M$$

When the shaft is brought to rotate, there will occur in the system rotational voltages causing, inter alia, a change in the frequency of the voltages supplied to the phase-shifting networks. Owing to the fact that these voltage and frequency changes are identical within the two transmitters constituted by the transmitter elements 4, 5 and the phase-shifting network 8, and by the transmitter elements 6, 7 and the phase-shifting network 9, respectivly, and co-operating with the toothed wheels 2 and 3, respectively, the measurement will remain uninfluenced by said changes.

Through feeding the measuring device 10 with a voltage proportional to shaft speed, it is possible also to cause said device to produce an output voltage which is directly proportional to the shaft speed multiplied by the torque, i.e. to the shaft power.

As to the transmitter elements co-operating with the toothed wheels 2 and 3 it has already been mentioned that each pair of such elements may comprise two completely separate elements, or the two elements of each pair may form an integral unit. If the transmitter elements of each transmitter are constituted by two separate elements, this will result in the advantage of enabling symmetry, amplitude similarity and orthogonality to be readily adjusted for each pair of transmitter elements. However, the desired characteristic features can be obtained also as regards pairs of integrated transmitter elements provided that the manufacturing accuracy is satisfactory for the purpose.

Figure 2:
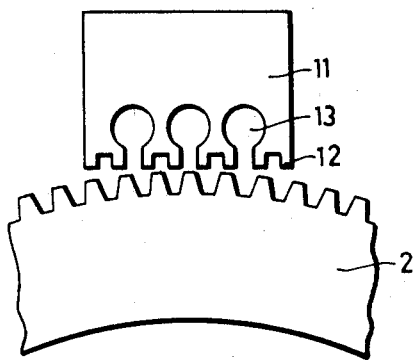
FIGURE 2 is a plan view of the iron core of a pair of inductive transmitter elements and the adjacent portion of a toothed wheel.
Figure 3:
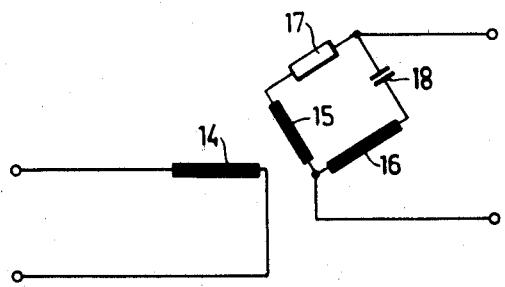
FIGURES 3 and 4 are elementary diagrams illustrating two alternative embodiments of the transmitters of the arrangement according to FIGURE 1.

FIGURE 2 exemplifies the design of the iron core of a transmitter element pair. In this case, the iron core 11 is constituted by a sheet metal laminate which is substantially rectangular in cross section and formed at its side facing the toothed wheel 2 with teeth 12 and slots 13 for receiving the windings of the transmitter elements. The number of teeth of the transmitter core 11 should be different from the number of teeth of a corresponding segment of the toothed wheel 2. In the embodiment of FIGURE 2, 8 teeth of the transmitter core correspond to 7 teeth of the toothed wheel. The teeth should be shaped so as to cause the amplitude of the voltages induced in the secondary windings of the transmitter elements to vary sinusoidally in response to the angular position of the toothed wheel, one amplitude cycle corresponding to an angular displacement of the toothed wheel through $360°/q$, where $q$ represents the number of teeth of the toothed wheel.

The windings of the transmitter shown in FIGURE 2, comprise one primary winding 14 common to both of the transmitter elements and connected to an A.C. supply voltage source, and two secondary windings 15 and 16 in which two voltages displaced by 90° in space but of equal phase in time are induced. These voltages are fed to the phase-shifting network which is composed of a resistor 17 and capacitor 18 and in which said voltages are combined into a voltage vector having a direction, or an angle, determined by the angular position of the toothed wheel co-operating with the transmitter concerned.

Figure 4:
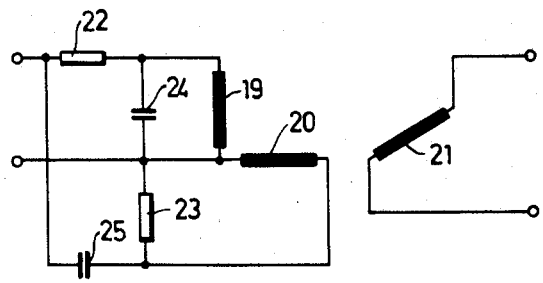

Such a voltage vector could also be obtained by means of a transmitter having the phase-shifting network connected in advance of the transmitter windings. FIGURE 4 exemplifies a transmitter of this kind. In this case, the transmitter has two electrically orthogonal primary windings 19 and 20, and one secondary winding 21 common to both transmitter elements of the transmitter. The voltage to be supplied to the primary windings will now pass through the phase-shifting network which is connected in advance of these windings and comprises two resistors 22, 23 and two capacitors 24, 25, whereby the voltages across the primary windings will be phase-displaced by 90° relative to each other.

Figure 5:
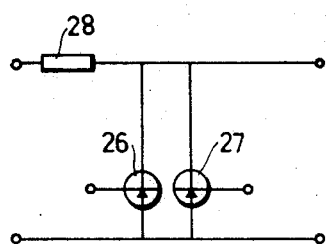
FIGURE 5 is an elementary diagram illustrating a device for determining angular differences, said device forming part of the arrangement illustrated in FIGURE 1.

The angular deviation measuring device, designated by 10 in FIGURE 1 and having for its purpose to measure the angular difference between the voltage vectors produced by the two transmitters in co-operation with their respective toothed wheels, may be designed in any of several different ways. FIGURE 5, by way of example, illustrates one simple design of such a measuring device. This device comprises two transistors 26 and 27 which are supplied with a D.C. voltage through a resistor 28 and the control voltages of which, fed to the base electrodes, are constituted by the output voltages from the two transmitters of the arrangement described hereinbefore. If the base electrode of transistor 26 has applied to it a voltage $$U_1 = \hat{U}_1 \cdot \cos \omega t$$

and the base of transistor 27 is fed with a voltage $-U_2$, where $U_2 = \hat{U}_2 \cdot \cos(\omega t + \varphi)$, then the output voltage $U_{out}$ from the measuring device will have the arithmetic mean $$U_s \cdot \frac{\varphi}{2\pi}$$

where $U_s$ designates the magnitude of the D.C. supply voltage. Thus, the output voltage of the measuring device will be directly proportional to the difference in phase angle between the voltages $U_1$ and $U_2$ and independent of the amplitudes of these voltages.

Figure 6:
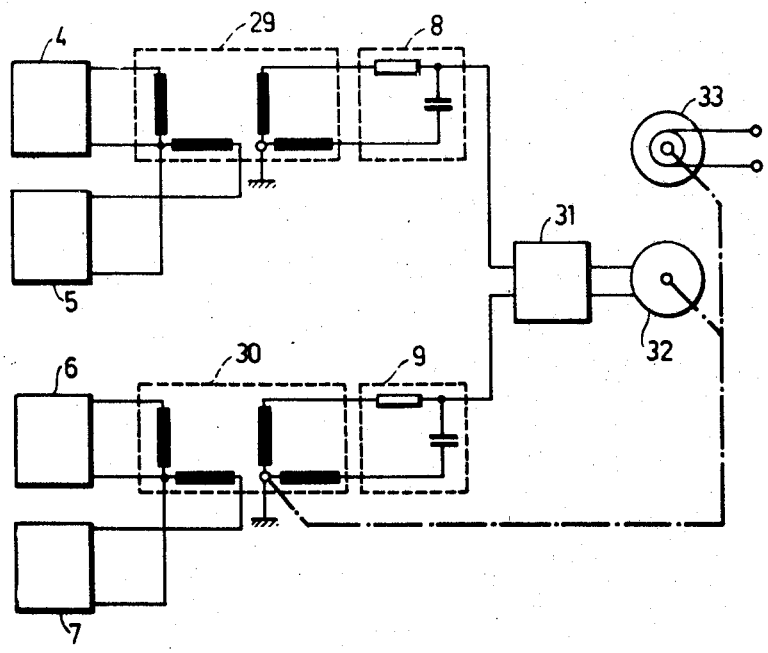
FIGURE 6 is an elementary diagram illustrating an arrangement according to another embodiment of the invention.

In certain cases, it may be desirable to have an arrangement presenting a load-independent output. FIGURE 6, by way of example, illustrates an arrangement which satisfies this requirement. In this case there is connected between each pair of transmitter elements 4, 5 and 6, 7, respectively, and its associated phase-shifting network, 8 and 9, respectively, a resolver 29 and 30, respectively. The two phase-shifting networks 8 and 9 are connected to the input of an amplifier 31 the output of which is connected to a servo-motor 32 having its shaft mechanically connected, on one hand, to the shaft of an inductive potentiometer 33 constituted for instance by a synchro, and, on the other hand, to the rotor shaft of the resolver 30. Thus, while the rotor of resolver 30 is rotatable under the action of servo-motor 32, the rotor of resolver 29 is stationary. The arrangement is such that the servo-motor tends to rotate the rotor of resolver 30 towards the position in which the input voltage supplied to amplifier 31, which is constituted by the difference between the output voltages of the two phase-shifting networks 8 and 9, assumes its zero value. Hereby the inductive potentiometer 33 can be caused to produce an output voltage proportional to the difference angle between the two toothed wheels 2 and 3, and thus to the torque acting on the shaft 1. By suitably dimensioning the potentiometer 33, it is possible to obtain a high output power therefrom.

In the arrangement of FIGURE 6, the resolver 29 may be omitted. However, it has been included in FIGURE 6 in order to promote the understanding of the mode of operation of the arrangement. Further, where the representation of the angular difference as an electric signal is not required, the indication of the angular difference may be effected in any other way, such as by means of a pointer mechanically coupled to the shaft of resolver 30.

It should be understood that the invention also includes an arrangement in which the angular position of each toothed wheel is sensed by more than one transmitter. Thus, for instance, two transmitters disposed on opposite sides of a toothed wheel may be used in order to compensate for any deficiency in symmetry of the toothed wheel.

What is claimed is:

1. A system for measuring angular differences between two toothed wheels, comprising two inductive transmitters each of which is operatively coupled to one of said toothed wheels to produce electric signals responsive to the angular position of the respective toothed wheel, and a comparison unit operatively coupled to said two transmitters and adapted to measure the difference between their output signals, each of said transmitters being operatively coupled to an external alternating voltage source and comprising primary- and secondary windings to produce an alternating voltage vector in each of said transmitters of the type:

$$\overline{U}_a = k_1 \cdot \hat{U} \cdot \sin \omega t \cdot e^{j q \beta_0}$$

$$\overline{U}_b = k_1 \cdot \hat{U} \cdot \sin \omega t \cdot e^{j q (\beta_0 + \varphi)}$$

where $q$ is the number of teeth and $\beta_0$ is the angular co-ordinate of one of said toothed wheels in space and $\beta_0 + \varphi$ is the angular co-ordinate of the other of said toothed wheels in space, said angular co-ordinates varying from 0 to 360 degrees for each tooth pitch and said comparison unit being connected to said two transmitters to measure the angular difference $\varphi$ between the voltage vectors produced by the said transmitters whereby an output signal is received the amplitude of which is dependent on the angular difference between these voltage vectors and consequently between said two toothed wheels.

2. The system of claim 1 wherein the toothed wheels are axially spaced on a shaft for measuring the torsion angle of said shaft.

3. The system of claim 1 wherein the toothed wheels are axially spaced on a shaft and the output signal of the comparison unit is the product of the speed of said shaft and the torsion angle of said shaft.

4. A system in accordance with claim 1 wherein one transmitter means includes a resolver, having its shaft mechanically coupled to the shaft of a servo-motor controlled by the output of an amplifier whose input is the outputs of the transmitter means.

References Cited

UNITED STATES PATENTS

| | | | |
|---|---|---|---|
| 2,270,760 | 1/1942 | Mershon | 73—136 |
| 2,675,700 | 4/1954 | Van Degrift et al. | 73—136 |
| 2,905,874 | 9/1959 | Kelling | 336—30 XR |
| 3,045,197 | 7/1962 | Vanslette | 336—135 |
| 3,281,655 | 10/1966 | Blasingame | 336—30 XR |

CHARLES A. RUEHL, Primary Examiner

U.S. Cl. X.R.

336—30